United States Patent
Lin et al.

(10) Patent No.: US 9,367,152 B2
(45) Date of Patent: Jun. 14, 2016

(54) INTERACTIVE PROJECTION SYSTEM AND INTERACTIVE IMAGE-DETECTING METHOD

(71) Applicant: DELTA ELECTRONICS, INC., Taoyuan Hsien (TW)

(72) Inventors: Cho-Cheng Lin, Taoyuan Hsien (TW); Chin-Tang Cho, Taoyuan Hsien (TW); Chia-Chen Wu, Taoyuan Hsien (TW); Wen-Chi Lin, Taoyuan Hsien (TW); Chih-Chieh Lin, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 403 days.

(21) Appl. No.: 13/974,185

(22) Filed: Aug. 23, 2013

(65) Prior Publication Data

US 2014/0354546 A1 Dec. 4, 2014

(30) Foreign Application Priority Data

May 30, 2013 (TW) .............................. 102119068 A

(51) Int. Cl.
*G09G 5/00* (2006.01)
*G06F 3/038* (2013.01)
*G06F 3/041* (2006.01)
*G06F 3/042* (2006.01)

(52) U.S. Cl.
CPC ............ *G06F 3/0386* (2013.01); *G06F 3/0418* (2013.01); *G06F 3/0425* (2013.01)

(58) Field of Classification Search
CPC .................................................... G06F 3/0386
USPC .......................................................... 345/1.3
See application file for complete search history.

(56) References Cited

U.S. PATENT DOCUMENTS

| | | | | |
|---|---|---|---|---|
| 6,766,066 B2* | 7/2004 | Kitazawa | .............. | G06F 3/0386 345/179 |
| 6,802,611 B2* | 10/2004 | Chu | .................... | H04N 1/19594 353/28 |
| 8,188,973 B2* | 5/2012 | Shan | .................... | G06F 3/03542 345/157 |
| 8,449,122 B2* | 5/2013 | Luo | ........................ | G06F 3/0386 345/156 |
| 2007/0290996 A1* | 12/2007 | Ting | ....................... | G06F 3/0386 345/157 |
| 2008/0158438 A1 | 7/2008 | Maeda et al. | | |
| 2011/0169778 A1* | 7/2011 | Nungester | ........... | G06F 3/03542 345/175 |
| 2012/0019560 A1 | 1/2012 | Inoue | | |
| 2012/0030595 A1 | 2/2012 | Itahana et al. | | |
| 2013/0082923 A1 | 4/2013 | Lin | | |
| 2013/0179599 A1* | 7/2013 | Ichieda | .................. | G06F 3/0383 710/8 |

FOREIGN PATENT DOCUMENTS

TW 201243645 11/2012

* cited by examiner

*Primary Examiner* — Jason Olson
(74) *Attorney, Agent, or Firm* — Kirton McConkie; Evan R. Witt

(57) ABSTRACT

An interactive projection system includes an electronic device, a projection device and an interactive module. The projection device is connected with the electronic device for receiving a first image signal generated by the electronic device and accordingly projecting a first image. The interactive module includes a processing unit, a storage unit connected with the processing unit for storing a calibration data, an image capture unit connected with the processing unit for capturing the first image and a light point image, and a communication unit connected with the electronic device and the processing unit for transmitting an absolute coordinate information computed and generated by the processing unit according to the light point image and the calibration data to the electronic device. An output signal is generated by the electronic device with the absolute coordinate information. Therefore, the present invention avoids the repeating image calibration and reduces labor cost and time cost.

6 Claims, 7 Drawing Sheets

INTERACTIVE PROJECTION SYSTEM AND INTERACTIVE IMAGE-DETECTING METHOD

FIELD OF THE INVENTION

The present invention relates to an interactive projection system, and more particularly to an interactive projection system and an interactive image-detecting method.

BACKGROUND OF THE INVENTION

With growing of digital technologies and electronic products, data sorting and information presentation becomes quicker and more convenient with auxiliary electronic devices. The electronic briefings are the most popular because users may freely edit the electronic briefings on electronic devices and easily add visual effects, music, sounds and even videos into the electronic briefings with typesetting software, so that the attraction and the effect of the electronic briefings are both enhanced.

In general, an electronic briefing is performed and stored in an electronic device, and then projected on a projection screen when presenting the electronic briefing. To enhance the attraction of briefing, the speaker expects to freely walk around and interact with the audiences. Under this circumstance, an interactive projection system is developed. By using a control device of the interactive projection system to execute specific operations, the limitation of wire connection is avoided, such that a user may directly control the playing of the electronic briefing and guide the words on the electronic briefing through the handheld control device.

For example, a conventional interactive projection system includes a camera, a projector and an infrared radiation (hereinafter "IR") pen. A light indicative image emitted by the IR pen controlled by a user is captured by the camera of the conventional interactive projection system and sent to the electronic device. The light indicative image is analyzed by the software pre-installed in the electronic device, and then the actual position corresponding to the light indicative image is obtained. The position information is transmitted from the software to the electronic device, so that the interaction is implemented.

However, there are still some drawbacks. Every user has to install some calibration software to perform image correction for this conventional interactive projection system to work. The correction data is stored in the electronic device. In other words, the projection device is not a plug and play device matched with the electronic device. Before using the conventional interactive projection system, users have to execute some image correction algorithms every time. It is not only inconvenient, but also a waste of meeting time. Simultaneously, the labor cost and time cost are also increased.

There is a need of providing an interactive projection system and an interactive image-detecting method to obviate the drawbacks encountered from the prior art.

SUMMARY OF THE INVENTION

One embodiment of the present invention provides an interactive projection system and an interactive image-detecting method in order to eliminate the drawbacks of repeated software installation and image correction-calibration process across different electronic devices and high labor and time costs.

According to one embodiment of the present invention, by utilizing an interactive module for image capturing and computing the absolute coordinate information, the projection device is applied to different electronic devices without pre-installing software. As a result, the repeated software installation is avoided, and the labor and time costs are reduced.

According to one embodiment of the present invention, since the light indicative image emitted by an IR pen is positioned through absolute coordinate information, the projection device of the present invention is applied to different projection resolutions without repeating calibration.

In accordance with an aspect of the present invention, there is provided an interactive projection system. The interactive projection system includes an electronic device, a projection device and an interactive module. A first image signal is generated by the electronic device. The projection device connected to the electronic device receives the first image signal and projects it as a "first image". The interactive module includes a processing unit, a storage unit, an image capture unit and a communication unit. The storage unit is connected with the processing unit for storing calibration data. The image capture unit is connected with the processing unit for capturing the first image and at least one light indicative image. Absolute coordinate information is computed and generated by the processing unit based on the light indicative image and the calibration data. The communication unit is connected with the electronic device and the processing unit for transmitting the absolute coordinate information to the electronic device, such that an output signal is generated by the electronic device with the absolute coordinate information.

In accordance with another aspect of the present invention, there is provided an interactive image-detecting method. The interactive image-detecting method includes steps of (a) providing an electronic device, a projection device and an interactive module, (b) determining if calibration data corresponding to the projection device exists in the interactive module, (c) capturing an image, (d) determining if the image comprises a light indicative image, (e) computing and generating an absolute coordinate information according to the light indicative image and the calibration data, (f) transmitting the absolute coordinate information to the electronic device, and (g) generating an output signal with the absolute coordinate information. When the result of the step (b) is true, the step (c) is performed after the step (b). When the result of the step (d) is true, the step (e) is performed after the step (d). When the result of the step (d) is false, the step (c) is performed after the step (d).

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
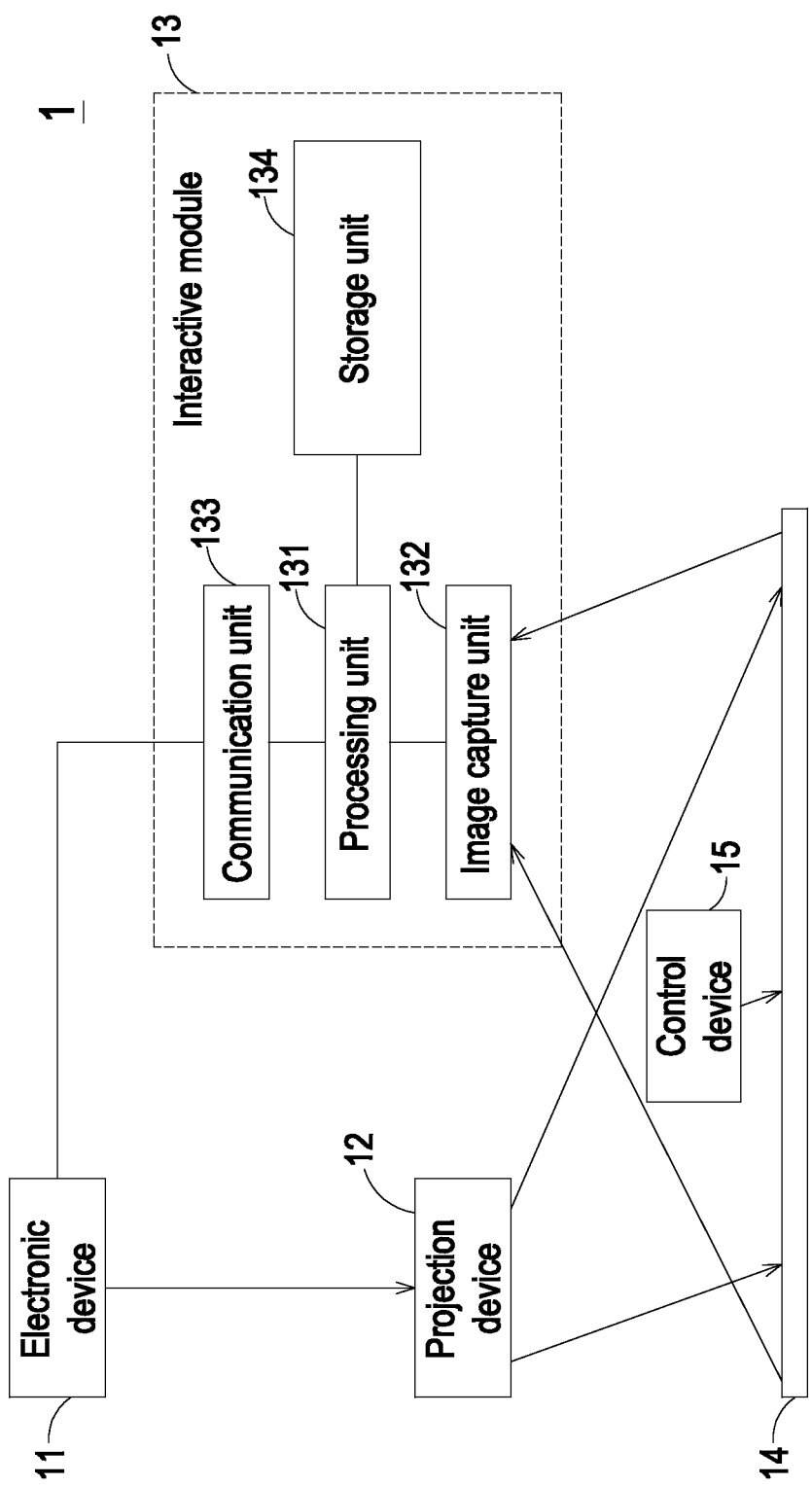
FIG. 1 schematically illustrates the configuration of an interactive projection system according to an embodiment of the present invention.

Please refer to FIG. 1. FIG. 1 schematically illustrates the configuration of an interactive projection system according to an embodiment of the present invention. The interactive projection system 1 includes an electronic device 11, a projection device 12 and an interactive module 13. A first image signal is generated by the electronic device 11, including but not limited to a PC, a notebook PC, a tablet PC or a smart phone. The projection device 12 connected to the electronic device 11 receives the first image signal and projects it as a "first image". The projection device 12 may be any kind of optical projector, which is used for projecting the first image or other projection images to a projection zone 14, preferably a flat plane, but not limited thereto. The interactive module 13 includes a processing unit 131, an image capture unit 132, a communication unit 133 and a storage unit 134. In this embodiment, the storage unit 134 is connected with the processing unit 131 for storing calibration data. The image capture unit 132 is connected with the processing unit 131 for capturing a first image and at least one light indicative image. Absolute coordinate information is computed and generated by the processing unit 131 based on the light indicative image and the calibration data. The communication unit 133 is connected with the electronic device 11 and the processing unit 131 for transmitting the absolute coordinate information to the electronic device 11, such that an output signal is generated by the electronic device 11 with the absolute coordinate information. An example of the output signal includes but not limited to a second image signal, in which the second image signal is received by the projection device 12, and a second image is projected by the projection device 12 according to the second image signal. As a result, the projection device 12 is applied to different electronic devices 11 without pre-installing software. Also, the repeated software installation is avoided, and the labor and time costs are reduced.

In addition, the first image signal includes a first icon position signal, and the second image signal includes a second icon position signal. The first icon position signal and the second icon position signal may be the mouse icon position signals or virtual button position signals. The second icon position signal is generated according to the absolute coordinate information. In some embodiments, the absolute coordinate information is composed of logical data, and for example, the defining range of the logical data can be 0 to 0x7FFF in hexadecimal. That is, the absolute coordinate information is defined through the definition of the USB human interface device class. The communication unit 133 is registered to the electronic device 11 through the USB protocol, and the absolute coordinate information is transmitted between the communication unit 133 and the electronic device 11 through the USB protocol. The logical data is registered in the range of 0 to 0x7FFF. When absolute coordinate information is transmitted to the electronic device 11, the absolute coordinate is automatically mapped to a value corresponding to the resolution of the electronic device 11 in range of 0 to 0x7FFF. For example, when the resolution of the electronic device 11 is 1280×1024 and the received absolute coordinate information is (0x800, 0x700), the absolute coordinate information is directly transformed into the actual coordinate (80, 56) on the screen of the electronic device 11 by the electronic device 11. The calculations are given by:

Coordinate on $x$ axis = $0x800/0x7FFF \times 1280 = 80$

Coordinate on $y$ axis = $0x700/0x7FFF \times 1024 = 56$

Since the second icon position signal is directly generated according to the absolute coordinate information without first icon position signal, the icon is positioned through the absolute coordinate information, and the projection device 12 of the present invention is applied to different electronic devices and different projection resolutions without repeating calibration.

In some embodiments, the processing unit 131 of the interactive module 13 is a digital signal processor (DSP), a central processing unit (CPU) or a microcontroller unit (MCU), the image capture unit 132 is a complementary metal-oxide-semiconductor (CMOS) or a charge-coupled device (CCD), the communication unit 133 is a USB unit, a Bluetooth unit, a Wi-Fi unit or other wired/wireless communication unit, and the storage unit 134 is a flash memory, an EEPROM, a disk, a memory, a hard drive, a solid-state drive or the like, but not limited thereto.

Moreover, the interactive projection system 1 of the present invention further includes a control device 15. The light indicative image is generated and emitted by the control device 15 and at least partially overlapped with the first image. In some embodiments, the control device 15 may be pen-shaped (not shown) and include LED and switch units. When the switch units are pressed and turned on by a user, the LED is enabled; thus the light indicative image is generated.

Figure 2:
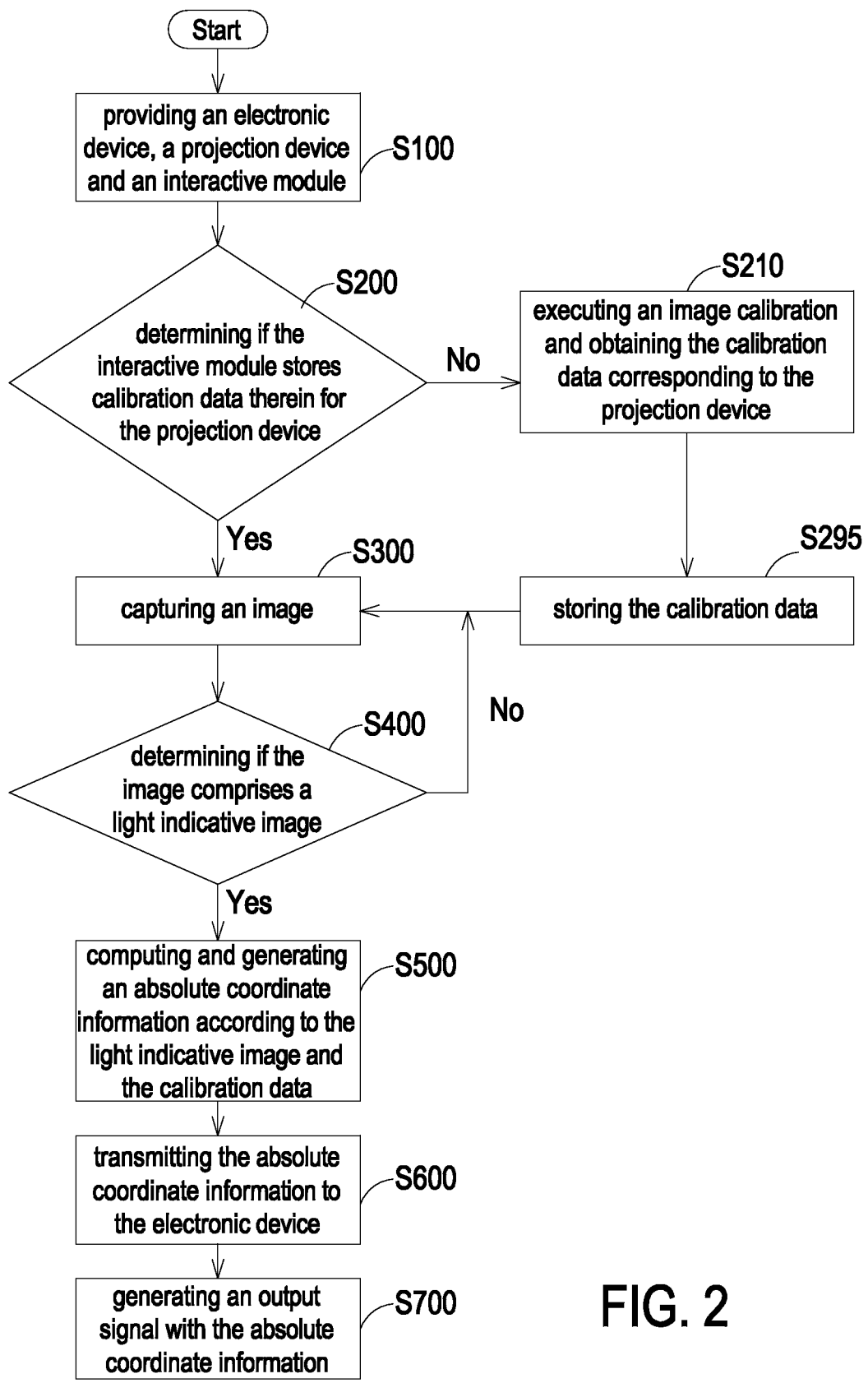
FIG. 2 schematically illustrates the flow chart of an interactive image-detecting method according to an embodiment of the present invention.

Please refer to FIG. 1 and FIG. 2. FIG. 2 schematically illustrates the flow chart of an interactive image-detecting method according to an embodiment of the present invention. As shown in FIG. 1 and FIG. 2, the interactive image-detecting method of the present invention includes steps S100 to S700 as follows. The flow is started at step S100, providing an electronic device 11, a projection device 12 and an interactive module 13. Next, determining if calibration data corresponding to the projection device 12 exists in the storage unit 134 of the interactive module 13 as shown in step S200. When the result of step S200 is true, capturing an image as shown in step S300 is performed after step S200. Then, determining if the image includes a light indicative image as shown in step S400. When the result of step S400 is false, capturing an image as shown in step S300 is performed after step S400 for re-capturing the image and re-determining whether or not the image comprises a light indicative image. When the result of step S400 is true, computing and generating absolute coordinate information based on the light indicative image and the calibration data as shown in step S500 is performed after step S400. Next, as shown in step S600, transmitting the absolute coordinate information to the electronic device 11. At last, generating an output signal with the absolute coordinate information as shown in step S700.

In some embodiments, when the result of step S200 is false, processing an image calibration and obtaining the calibration data corresponding to the projection device 12 as shown in step S210 and storing the calibration data in the storage unit 134 of the interactive module 13 as shown in step S295 are performed after step S200. Therefore, after executing step S295, the calibration data corresponding to the projection device 12 is stored in the storage unit 134 of the interactive module 13, so that step S300 can be performed after step S295, the incoming flow is similar to the embodiments mentioned above, and is not redundantly described herein.

Figure 3:
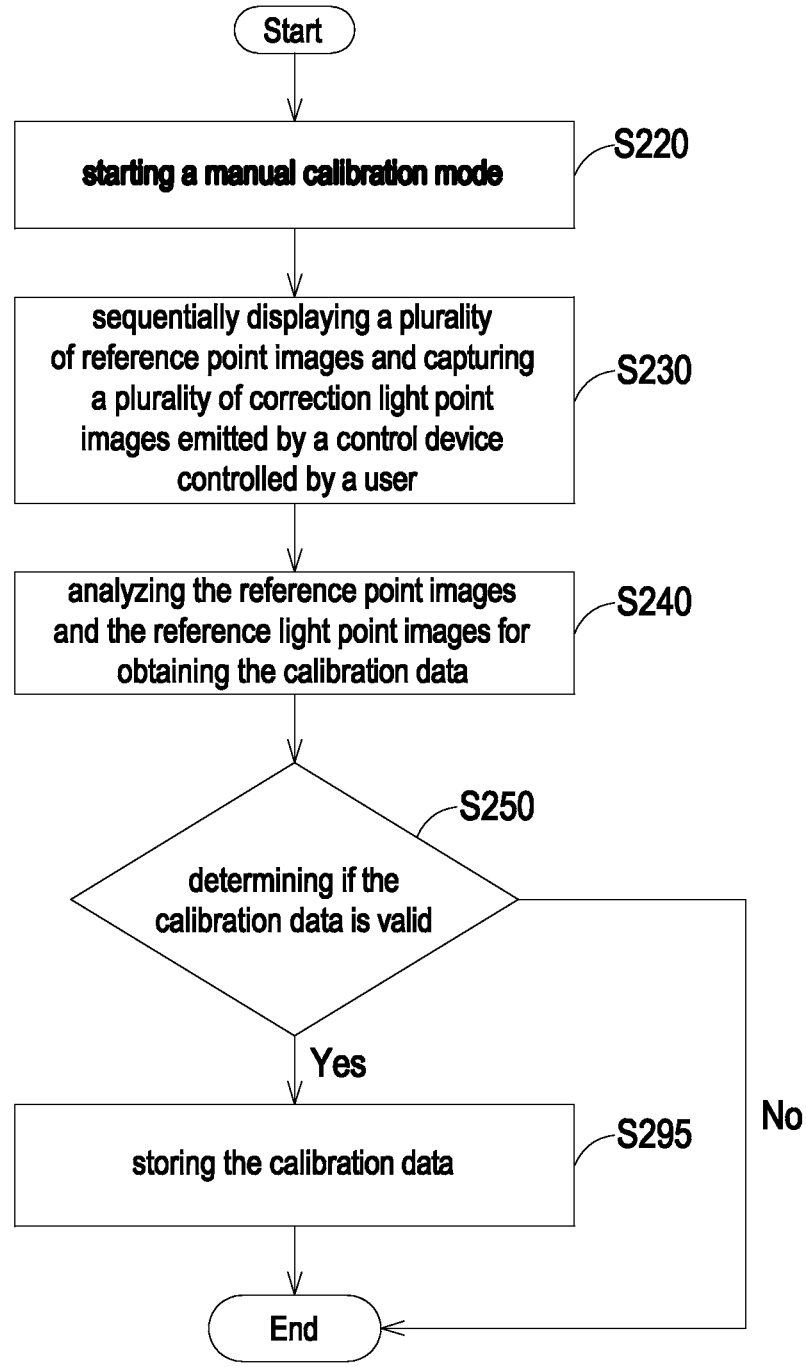
FIG. 3 schematically illustrates the detailed flow chart of an interactive image-detecting method according to an embodiment of the present invention.
Figure 4:
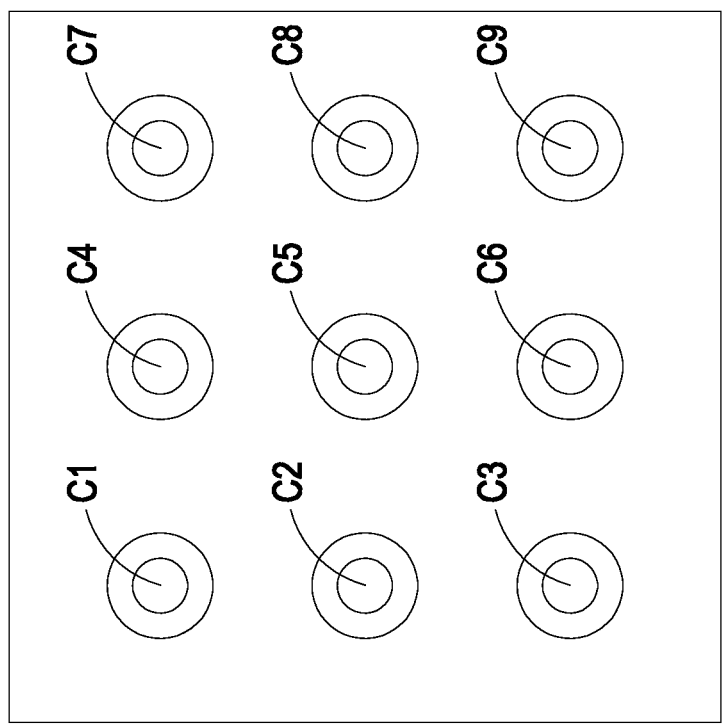
FIG. 4 schematically illustrates the reference point images according to an embodiment of the present invention.

In some embodiments, the image calibration of step S210 is a manual image calibration. Please refer to FIG. 3 and FIG. 4. FIG. 3 schematically illustrates the detailed flow chart of an interactive image-detecting method according to an embodiment of the present invention. FIG. 4 schematically illustrates the reference point images according to an embodiment of the present invention. As shown in FIG. 3 and FIG. 4, the flow of the manual image calibration is started at step S220, starting a manual calibration mode. Next, sequentially displaying a plurality of reference point images, which are for example nine reference point images C1, C2, . . . , and C9, and capturing a plurality of correction light point images emitted by a control device 15 controlled by a user as shown in step S230. In other words, the user may only control the control device 15 to emit correction light points and sequentially align the correction light points to the nine reference point images C1-C9. The correction light points are further captured by the image capture unit 132 so as to be correction light point images. It should be noted that the number of the correction point images and the number of the correction light point images are not limited in this embodiment, and may be adjusted for meeting the demands of actual requirements. Then, as shown in step S240, analyzing the reference point images and the correction light point images and comparing the theoretical positions of the reference point images with the actual positions of the correction light point images for obtaining the calibration data. At last, determining if the calibration data is valid as shown in step S250. When the result of step S250 is true, storing the calibration data as shown in step S295 is performed after step S250. On the other hand, when the result of step S250 is false, failure information is returned and the manual calibration mode is terminated, so that the user may select the manual calibration mode, the automatic calibration mode or no action.

Figure 5:
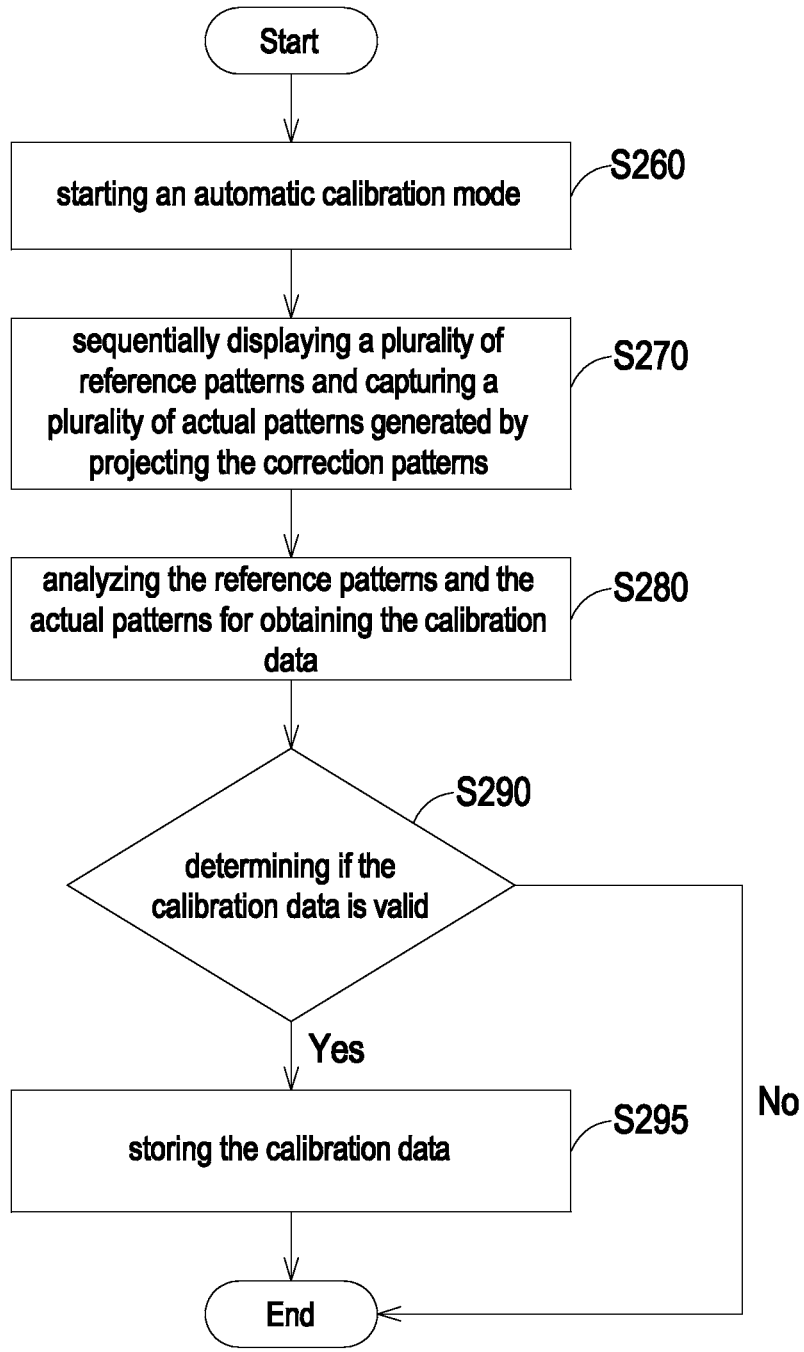
FIG. 5 schematically illustrates the detailed flow chart of an interactive image-detecting method according to another embodiment of the present invention.
Figure 6:
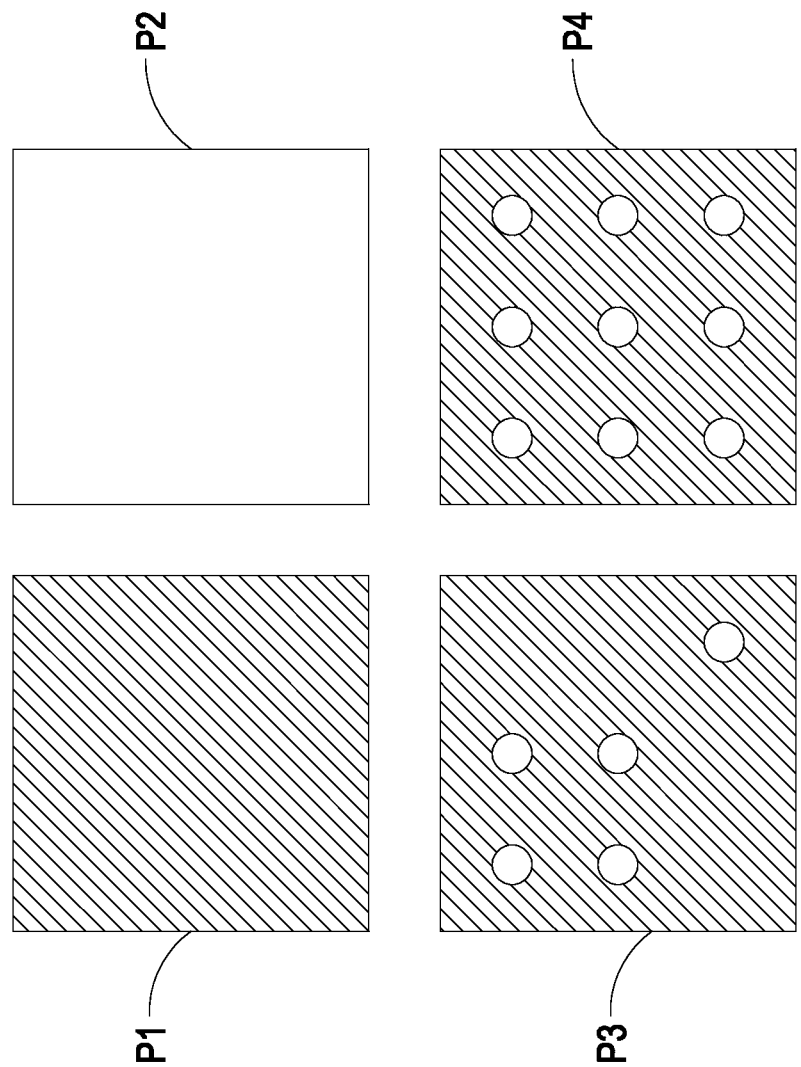
FIG. 6 schematically illustrates the reference patterns according to an embodiment of the present invention.

In some embodiments, the image calibration of step S210 is an automatic image calibration. Please refer to FIG. 5 and FIG. 6. FIG. 5 schematically illustrates the detailed flow chart of an interactive image-detecting method according to another embodiment of the present invention. FIG. 6 schematically illustrates the reference patterns according to an embodiment of the present invention. As shown in FIG. 5 and FIG. 6, the flow of the automatic image calibration is started at step S260, starting an automatic calibration mode. Next, sequentially displaying a plurality of reference patterns, which include at least four reference patterns, i.e. a first reference pattern P1, a second reference pattern P2, a third reference pattern P3 and a fourth reference pattern P4, and capturing a plurality of actual patterns generated by projecting the reference patterns as shown in step S270. It should be realized that the actual patterns are the images/patterns projected by the projection device 12 according to the reference patterns, but not the image signals of images or image files. Then, as shown in step S280, analyzing the reference patterns and the actual patterns and comparing the theoretical positions of the reference patterns with the actual positions of the actual patterns for obtaining the calibration data. At last, determining if the calibration data is valid as shown in step S290. When the result of step S290 is true, storing the calibration data as shown in step S295 is performed after step S290. On the other hand, when the result of step S290 is false, failure information is returned and the automatic calibration mode is terminated, so that the user may select the manual calibration mode, the automatic calibration mode or no action.

In some embodiments, the first reference pattern P1 and the second reference pattern P2 are inverse to each other in color. The third reference pattern P3 is a rotational indicative pattern for determining spatial direction such as up-down and left-right. The fourth reference pattern P4 is a positional reference pattern for comparing the expected positions of light points according to the fourth reference pattern P4 image signal and the actual projected positions of light points through a projection device. The comparison results will be stored and then used to adjust the shape of projected images afterward. Under this circumstance, a contrast analysis and a brightness analysis are implemented according to the first reference pattern P1 and the second reference pattern P2, a direction analysis of the projection is implemented according to the third reference pattern P3, and a position calibration analysis is implemented according to the fourth reference pattern P4 in the automatic calibration of the embodiment mentioned above, but not limited thereto.

Preferably, the first reference pattern P1 is all black, the second reference pattern P2 is all black, the third reference pattern P3 is composed of the first reference pattern P1 and five white points, and the fourth reference pattern P4 is composed of the first reference pattern P1 and nine white points. It should be noted that the number of the white points in the reference patterns and the order or sequence of the reference patterns P1-P4 are not limited herein.

Figure 7:
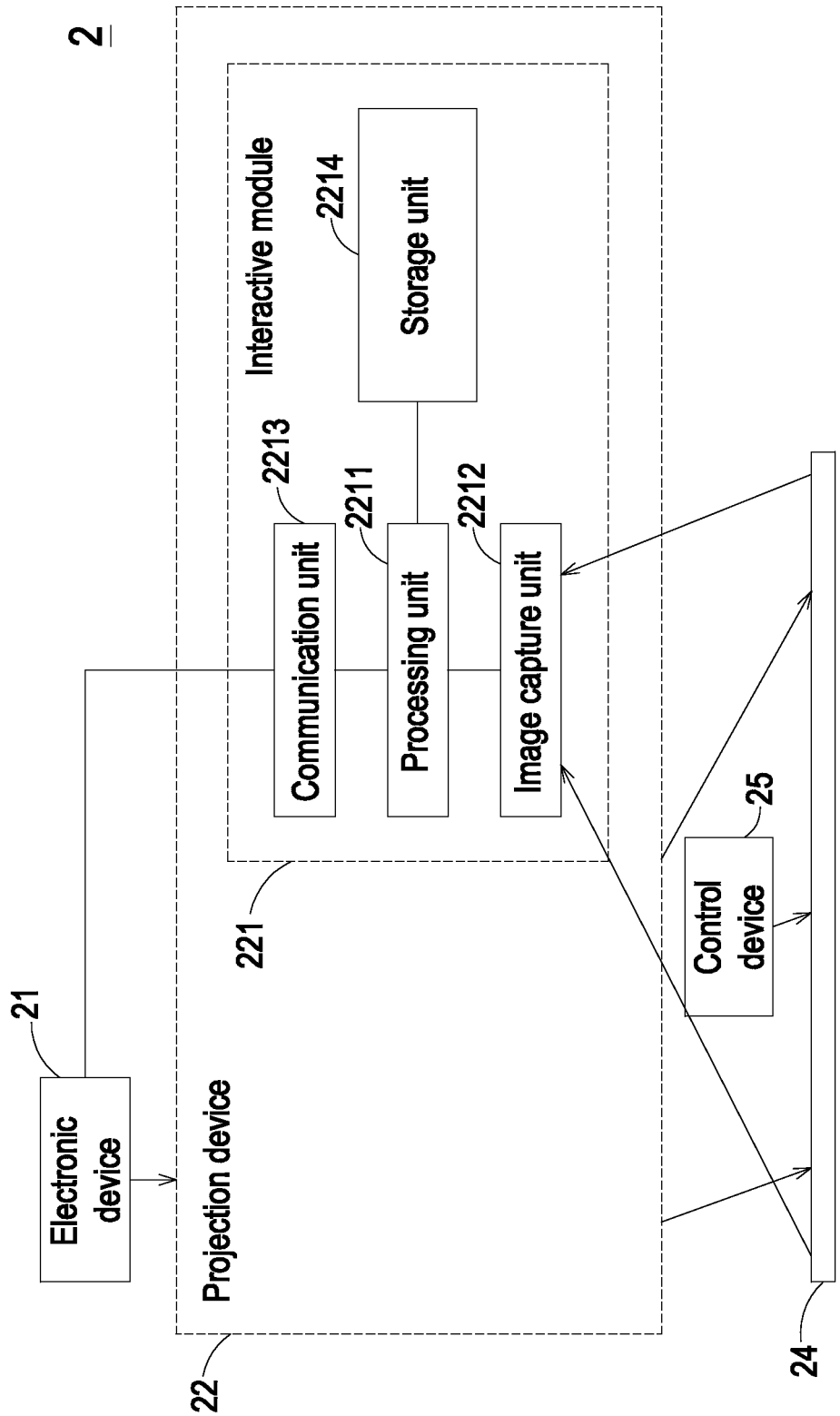
FIG. 7 schematically illustrates the configuration of an interactive projection system according to another embodiment of the present invention.

Please refer to FIG. 7. FIG. 7 schematically illustrates the configuration of an interactive projection system according to another embodiment of the present invention. An interactive projection system 2 includes an electronic device 21 and a projection device 22. The projection device 22 includes an interactive module 221, and the interactive module 221 includes a processing unit 2211, an image capture unit 2212, a communication unit 2213 and a storage unit 2214. In this embodiment, the electronic device 21, the projection device 22, the interactive module 221, the processing unit 2211, the image capture unit 2212, the communication unit 2213 and the storage unit 2214 are similar to the above-mentioned embodiments except that the interactive module 221 is integrated into the projection device 22, and not redundantly described herein. In other words, the interactive module 221 is at least partially disposed inside the projection device 22 in this embodiment.

From the above description, the present invention provides an interactive projection system and an interactive image-detecting method. By utilizing the interactive module for image capturing and computing the absolute coordinate information, the projection device is applied to different electronic devices without pre-installing software. As a result, the repeated software installation is avoided, and the labor and time costs are reduced. Meanwhile, since the light indicative image emitted by an IR pen is positioned through absolute coordinate information, the projection device of the present invention is applied to different projection resolutions without repeating calibration.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An interactive image-detecting method, comprising steps of:
   (a) providing an electronic device, a projection device and an interactive module;
   (b) determining if said interactive module stores calibration data therein for said projection device;
      (b1) executing an image calibration and obtaining said calibration data corresponding to said projection device;
      (b2) storing said calibration data;
   (c) capturing an image;
   (d) determining if said image comprises a light indicative image;
   (e) computing and generating absolute coordinate information according to said light indicative image and said calibration data;
   (f) transmitting said absolute coordinate information to said electronic device; and
   (g) generating an output signal with said absolute coordinate information,
   wherein when the result of said step (b) is true, said step (c) is performed after said step (b), wherein when the result of said step (d) is true, said step (e) is performed after said step (d), wherein when the result of said step (d) is false, said step (c) is performed after said step (d), wherein when the result of said step (b) is false, said step (b1) and said step (b2) is performed after said step (b), and wherein said step (b1) further comprises steps of:
      (b11) starting a manual calibration mode;
      (b12) sequentially displaying a plurality of reference point images and capturing a plurality of correction light point images emitted by a control device controlled by a user;
      (b13) analyzing said reference point images and said correction light point images for obtaining said calibration data; and
      (b14) determining if said calibration data is valid,
      wherein when the result of said step (b14) is true, said step (b2) is performed after said step (b14).

2. An interactive image-detecting method, comprising steps of:
   (a) providing an electronic device, a projection device and an interactive module;
   (b) determining if said interactive module stores calibration data therein for said projection device;
      (b1) executing an image calibration and obtaining said calibration data corresponding to said projection device;
      (b2) storing said calibration data;
   (c) capturing an image;
   (d) determining if said image comprises a light indicative image;
   (e) computing and generating absolute coordinate information according to said light indicative image and said calibration data;
   (f) transmitting said absolute coordinate information to said electronic device; and
   (g) generating an output signal with said absolute coordinate information,
   wherein when the result of said step (b) is true, said step (c) is performed after said step (b), wherein when the result of said step (d) is true, said step (e) is performed after said step (d), wherein when the result of said step (d) is false, said step (c) is performed after said step (d), wherein when the result of said step (b) is false, said step (b1) and said step (b2) is performed after said step (b), and wherein said step (b1) further comprises steps of:
      (b11) starting an automatic calibration mode;
      (b12) sequentially displaying a plurality of reference patterns and capturing a plurality of actual patterns generated by projecting said reference patterns;
      (b13) analyzing said reference patterns and said actual patterns for obtaining said calibration data; and
      (b14) determining if said calibration data is valid,
      wherein when the result of said step (b14) is true, said step (b2) is performed after said step (b14).

3. The interactive image-detecting method according to claim 2, wherein said reference patterns comprises a first reference pattern, a second reference pattern, a third reference pattern and a fourth reference pattern.

4. The interactive image-detecting method according to claim 3, wherein said first reference pattern and said second reference pattern are inverse to each other in color.

5. The interactive image-detecting method according to claim 4, wherein said third reference pattern has a rotational indicative pattern for determining spatial direction.

6. The interactive image-detecting method according to claim 5, wherein said fourth reference pattern has a positional reference pattern for determining the shape of the projected image.

* * * * *